United States Patent
Hulse

(10) Patent No.: US 6,594,417 B1
(45) Date of Patent: Jul. 15, 2003

(54) WAVEGUIDE ASSEMBLY FOR LATERALLY-DIRECTED ILLUMINATION IN A VEHICLE LIGHTING SYSTEM

(75) Inventor: George Robert Hulse, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/889,445
(22) PCT Filed: Jan. 14, 2000
(86) PCT No.: PCT/US00/01094
§ 371 (c)(1), (2), (4) Date: Jul. 12, 2001
(87) PCT Pub. No.: WO00/42456
PCT Pub. Date: Jul. 20, 2000

Related U.S. Application Data
(60) Provisional application No. 60/115,830, filed on Jan. 14, 1999.

(51) Int. Cl.[7] .............................. G02B 6/42; G02B 6/26
(52) U.S. Cl. ..................... 385/31; 385/146; 385/901; 362/551; 362/487; 362/488
(58) Field of Search ........................... 385/31, 146, 901

(56) References Cited

U.S. PATENT DOCUMENTS

| | | | |
|---|---|---|---|
| 4,733,332 A | 3/1988 | Yamashita et al. | 362/32 |
| 4,763,984 A | 8/1988 | Awai et al. | 350/96.24 |
| 5,101,325 A * | 3/1992 | Davenport et al. | 362/26 |
| 5,233,679 A | 8/1993 | Oyama | 385/146 |
| 5,400,224 A | 3/1995 | DuNah et al. | 362/31 |
| 5,432,876 A | 7/1995 | Appeldorn | 385/31 |
| 5,495,400 A | 2/1996 | Currie | 362/32 |
| 5,678,914 A * | 10/1997 | Dealey et al. | 362/485 |
| 5,680,496 A * | 10/1997 | Burkitt et al. | 362/36 |
| 5,708,749 A | 1/1998 | Kacheria | 385/123 |
| 5,745,266 A * | 4/1998 | Smith | 359/13 |
| 5,982,969 A * | 11/1999 | Sugiyama et al. | 362/554 |
| 5,987,199 A * | 11/1999 | Zarian et al. | 362/559 |
| 2002/0054487 A1 * | 5/2002 | Parker et al. | 362/29 |

* cited by examiner

Primary Examiner—John D. Lee
Assistant Examiner—Daniel Valencia
(74) Attorney, Agent, or Firm—Reising, Ethington, Barnes, Kisselle, P.C.

(57) ABSTRACT

A distributed lighting system comprising a waveguide assembly that includes a vehicle interior trim panel having an elongated opening therein and a correspondingly elongated waveguide attached to the trim panel to provide laterally-directed illumination through the opening along the length of the waveguide. The waveguide is attached to the trim panel using a support frame that includes a light-transmissive lower wall which fits within the opening and a pair of opposed side walls that, together with the lower wall, define a channel in which the waveguide is located. The waveguide includes a light-scattering region located opposite the opening in the trim panel to direct light laterally out of the waveguide and through the opening. The waveguide assembly also includes a back cover that encloses the waveguide between the cover and support frame. Different waveguide cross-sections and light-scattering configurations are disclosed.

20 Claims, 2 Drawing Sheets

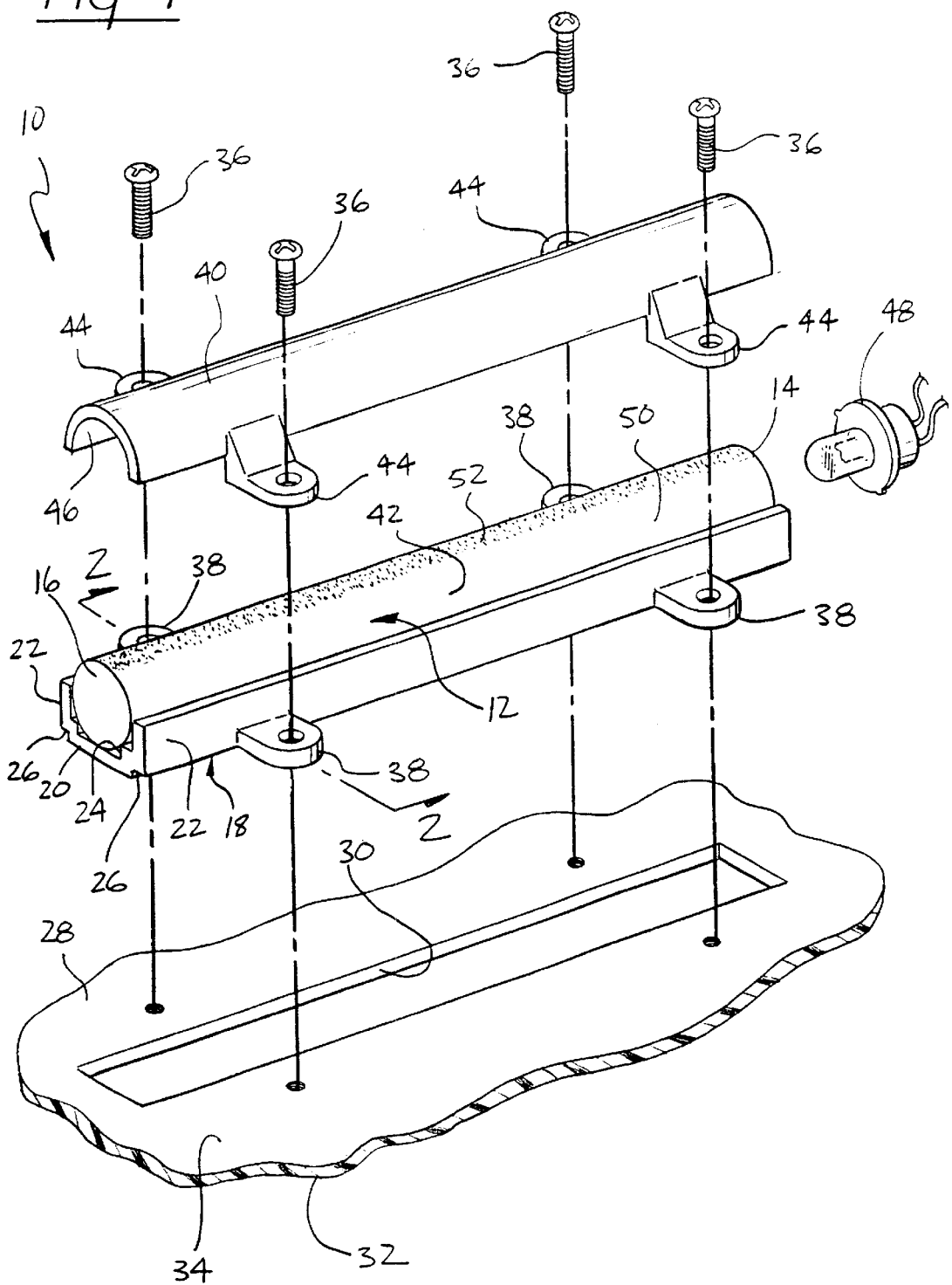

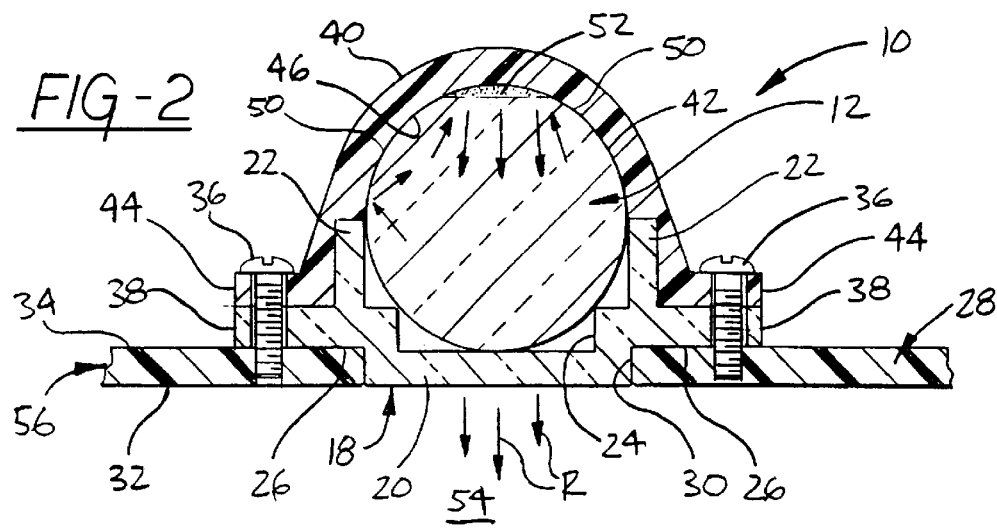
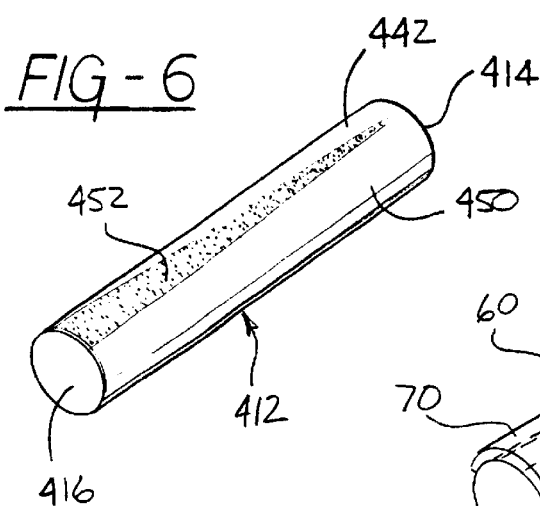
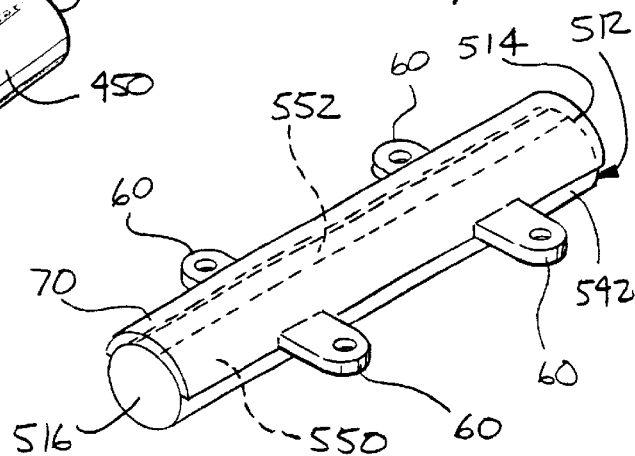

WAVEGUIDE ASSEMBLY FOR LATERALLY-DIRECTED ILLUMINATION IN A VEHICLE LIGHTING SYSTEM

CROSS REFERENCE TO RELATED APPLICATION

This application claims priority from Provisional Application No. 60/115,830, filed Jan. 14, 1999, and entitled "DISTRIBUTED LIGHTING SYSTEM," which is incorporated by reference.

TECHNICAL FIELD

This invention relates generally to lighting systems for automotive vehicles and more particularly to distributed lighting systems wherein light from a remote source is transmitted via a waveguide to desired areas within the interior of the vehicle.

BACKGROUND OF THE INVENTION

Distributed lighting systems (DLS's) are sometimes used in automotive interior lighting applications for directing light from a central source via optical fibers or other waveguides to illuminate selected areas of the interior of the vehicle. Many of such applications are directed toward illuminating instrument panels, controls, and the like in lieu of providing individual light sources for each location, such as incandescent or LED lamps.

In some instances, these distributed lighting systems use waveguides to route light to a remote location where it is emitted out of the end of the waveguide to provide back lighting or to provide illumination within the vehicle interior. Control of the light emitted from the ends of the waveguides can be accomplished using lenses or other optical elements. Rather than using a waveguide simply to carry light to a remote location, it is known to provide notches and other such surface features along the length of the waveguide to promote the lateral emission of light from the waveguide. See, for example, U.S. Pat. No. 5,845,038 to D. J. Lundin et al. As indicated in U.S. Pat. No. 5,659,643 to R. H. Appeldorn et al., it is also known to use waveguides of varying cross-sectional shape for this purpose.

To properly provide lengthwise illumination in a vehicle application using waveguides, some type of practical mounting assembly is required that permits the waveguide to be securely mounted in place while maintaining the desired illumination characteristics for the intended application. Accordingly, it is a general object of the invention to provide a directed lighting system which is particularly advantageous for use in connection with interior trim panels such as headliners, door panels, seat panels, visors, and the like to illuminate the cabin of a vehicle, including the floor of the vehicle, to provide an aesthetically pleasing yet effective illumination of the interior of the vehicle.

SUMMARY OF THE INVENTION AND ADVANTAGES

According to the invention, a distributed lighting system is provided having an elongated waveguide fabricated of light-transmissive material mounted on a support frame having a protective light-transmissive lens adjacent the waveguide opposite a light-scattering region of the waveguide for transmitting the light scattered by the region through the lens portion to light the interior of a vehicle.

The support frame is constructed to mount to an interior panel of a vehicle, such as a headliner, door panel, instrument panel, seat panel, or the like with the lens region of the support frame extending through a correspondingly shaped opening in the interior trim panel and the waveguide supported and concealed beneath the panel. The support frame is secured by suitable means to the trim panel, such as by mechanical fasteners, self-retaining connectors, or the like.

A reflective backing cover preferably extends and shrouds an exposed back surface region of the waveguide opposite the lens for redirecting any light that would otherwise escape through the back surface back into the waveguide for transmission through the lens. The cover may advantageously have connecting portions cooperating with associated connecting portions of the support frame for securing the waveguide within the channel.

BRIEF DESCRIPTION OF THE DRAWINGS

These and other features and advantages of the present invention will become more readily appreciated when considered in connection with the following detail description and appended drawings, wherein:

FIG. 1 is an exploded fragmentary perspective view of a distributed lighting system constructed according to a first presently preferred embodiment of the invention;

FIG. 2 is an enlarged cross-sectional view of the assembled components of FIG. 1 taken generally along lines 2—2 of FIG. 1;

FIGS. 3–5 are three alternative cross-sectional shapes that may be employed with the waveguide in lieu of the circular shape illustrated in the preceding figures;

FIG. 6 is still a further alternative construction of a waveguide having a variable width light-scattering region; and FIG. 7 is yet another embodiment of a waveguide having integrated mounting features.

DETAILED DESCRIPTION

A distributed light system (DLS) constructed according to a first presently preferred embodiment of the invention is shown generally at 10 in FIGS. 1 and 2 and comprises a waveguide 12 extending longitudinally between a light input end 14 and an opposite end 16 and being fabricated of a solid body of light-transmissive material such as acrylic or the like.

The DLS 10 includes a support frame 18 having a lower wall 20 and opposite laterally spaced side walls 22 defining a longitudinally extending channel 24 in which the waveguide 12 is disposed. At least the lower wall 20 and preferably the entire support frame 18 is fabricated of a light-transmissive material such as acrylic so that the lower wall 20 serves as a protective light-transmitting lens for the waveguide 12, as will be explained in greater detail below.

As shown best in FIG. 2, the side walls 22 preferably have a stepped profile defining opposite longitudinally extending outer shoulders 26 adjacent the lens 20. The stepped shoulders 26 enable the support frame 18 to be mounted on an interior trim panel 28 of an automotive vehicle with the lens portion 20 of the frame 18 projecting into a correspondingly shaped opening 30 in the panel 28. The panel 28 may comprise a headliner, a door panel, seat panel, visor, instrument panel, etc. With such an arrangement, only the lens portion 20 of the frame 18 is visible on the finished interior side 32 of the trim panel 28. The remaining portions of the frame 18 and components of the DLS 10 are disposed and concealed behind the panel 28 on a back side 34 thereof.

The support frame 18 is provided with some means of securing the frame 18 and thus the DLS 10 to the panel 28.

It will be appreciated that any of a number of fastening systems commonly used in the interior trim and lighting art may be employed, and may include a variety of mechanical fastening systems such as spring clips, self-retaining locking projections, adhesives, or simply screws 36, as illustrated in the drawings. The screws 36 extend through openings provided in screw mount portions 38 of the frame 18 projecting laterally outwardly of the side walls 22 on opposite sides of the channel 24 adjacent the shoulders 26 and are operative for securing the frame 18 to the trim panel 28 in the manner illustrated in FIG. 2. It will be appreciated from FIG. 1 that the frame 18 may be provided with a plurality of such screw mount portions 38 provided at spaced locations along the length of the frame 18.

One way of securing the waveguide 12 within the channel 24 of the frame 18 is by provision of a back cover 40 which fits over an exposed back side portion 42 of the waveguide 12 and is secured to the frame 18 thereby capturing the waveguide 12 between the frame 18 and cover 40 as shown best in FIG. 2. For purposes of securing the cover 40 to the frame 18, the cover may have similar screw mount portions 44 projecting from opposite lateral sides of the cover in alignment with the screw mount portions 38 of the frame 18 to accommodate the reception of the screws 36, such that the cover 40 may be simultaneously joined to the frame 18 and secured to the panel 28 via the screws 36. It will be appreciated, however, that any of a number of means may be employed to secure the cover 40 to the frame 18, such as adhesives, interlocking portions, welding, etc. Unlike the lens portion 20 of the frame 18, the cover 40 is non-transmissive of light (i.e., is opaque) and preferably has a reflective inner surface 46 that conforms closely in size and shape to that of the back side portion 42 of the waveguide 12 so as to redirect any light rays that would otherwise escape through the back side portion 42 of the waveguide 12 back into the waveguide 12 for transmission through the lens 20.

The waveguide 12 is operatively coupled at its light input end 14 to a source of light 48. The light source 48 may comprise an incandescent or LED lamp, or input from optical fibers or another waveguide. It is contemplated that the DLS 10 may thus comprise either a stand alone light system having its own light source 48 for directing light into the waveguide 12 through the input end 14, or may comprise a section of an overall larger distributed lighting system in which case the DLS 10 of the invention may comprise one of several branches of a multi-branch distributed lighting system of a vehicle.

The light which enters the waveguide 12 from the light source 48 is transmitted therealong toward the opposite end 16, and during its passage is reflected off the outer surface 50 of the waveguide 12 interiorly thereof according to known principles. To achieve internal reflection, the outer surface 50 of the waveguide 12 is generally smooth and free of imperfections that would act to defract the light. According to the invention, however, a select region 52 of the outer surface 50 of the waveguide 12 opposite the lens 20 is roughened such that the light encountering the region 52 is scattered. Some of the scattered light rays are directed toward the opposite side of the waveguide 12 where they are transmitted out of the waveguide 12 and through the lens 20 into an interior compartment 54 of a vehicle 56. The roughened light-scattering region 52 extends longitudinally of the waveguide 12 and, in the illustrated embodiment, is continuous between the ends 14, 16 of the waveguide 12. It is contemplated that there may be applications in which it may not be necessary or desirable to transmit the light from the waveguide 12 over its entire length, and in such instances the roughened light-scattering regions 52 may be interrupted by intervening smooth surface sections 50 along which the light would be internally reflected rather than transmitted out of the waveguide 12.

Any of a number of techniques may be employed to form the light-scattering region 52, and may include molding a roughened region 52 into the waveguide 12 during its formation, or by any of a number of post forming operations such as bead blasting, scribing, application of light-defracting tape, or other means which would act to scatter the light rays that encounter the region 52 so as to direct at least some of the defracted rays through the lens 20.

It will be observed from FIG. 2 that the light-scattering region 52 is straddled on either lateral side by smooth light-reflecting portions 50 of the outer surface which reflect and redirect the light inwardly of the waveguide with minimal scattering. Restricting the width and location of the light-scattering region 52 relative to the lens 20 results in a directed beam of light rays being transmitted through the lens 20. In the embodiment of FIGS. 1 and 2, the waveguide 12 has a solid circular cross-sectional shape, which acts to focus and collimate a portion of the scattered light rays R which are directed and transmitted through the lens 20 to provide an intense, directed beam of light into the interior 54 of the vehicle 56 as illustrated diagrammatically in FIG. 2.

FIGS. 3 and 4 show alternative waveguide cross-sectional shapes wherein the same reference numerals used in connection with the waveguide 12 are employed but are offset by increments of 100 and 200, respectively, to indicated like parts. Each of the waveguides 112, 212 of FIGS. 3 and 4 have curved lens configurations which act to focus and collimate some of the scattered light rays into a directed beam R for transmission through the support frame lens 20. The waveguide 112 of FIG. 3 has a parabolic cross-sectional shape which would serve to intensify the focusing the collimation of the scattered light rays to produce a high intensity beam of light R. The waveguide 212 illustrated in FIG. 4 has a flat, planar back side surface 242 on which the roughened region 252 is formed, causing light to be scattered in a nondirected manner. However, the opposite side of the waveguide adjacent the lens 20 has an exterior concave profile which would act to align and collimate some of the scattered light rays to provide an intense beam of light R transmitted through the lens 20.

FIG. 5 illustrates still a further embodiment 312 of the waveguide having a rectangular profile wherein the same reference numerals are employed for like features, but offset by 300. Such may be used in conjunction with a curved frame lens 20 having light-focusing characteristics for generating a similar directed beam of light into the interior 54 of the vehicle 56.

Some of the light entering the waveguide 12 through the light input end 14 will reach the opposite end 16 without having been transmitted through the lens 20. The end 16 may be capped off with reflective silver tape or the like so as to redirect the light back through the waveguide 12 toward the input end 14 to intensify the emission of light through the lens 20. Alternatively, the opposite end 16 may be coupled with a waveguide or fiber(s) of another DLS to serve as a light input source thereto.

As the light travels along the waveguide 12, it may have a tendency to lose some of its intensity as it nears the opposite end 16 relative to the intensity of the light adjacent the input end 14. To counteract such a problem, a waveguide 412 having an alternative construction is illustrated in FIG.

6 wherein again like reference numerals have been used to represent like features, but offset by 400. The roughened region 452 of the waveguide 412 is tapered so as to be wider adjacent the opposite end 416 and gradually narrowing toward the input end 414. This provides a relatively greater amount of light scattering adjacent the opposite end 416 to compensate for the reduced intensity there resulting from light lost laterally out of the waveguide 412 along its length.

FIG. 7 shows still another alternative embodiment of the waveguide 512 (corresponding reference numerals used, offset by 500) which is generally like that illustrated in and described in FIGS. 1 and 2 except for provision of integrated mounting features for securing the waveguide 512 to the support frame 18, which may take the form of compatible screw mount portions 60 that align and cooperate with the screw mount portions 38 of the frame 18 for accepting the screws 36 to join the waveguide 512 to the frame 18. With this embodiment of the waveguide 512, the fastened cover 40 may be omitted and, if desired, reflective tape 70 may be applied to the exposed back side portion 542 of the waveguide 512 for reflecting any scattered light that would otherwise escape through the back side portion 542 back into the waveguide 512. Beneath the tape 70 or incorporated into the inner surface of the tape 70 is a light-scattering region 552 as described previously.

The invention thus contemplates a DLS having a waveguide mounted in a support frame formed with a protective light-transmitting lens portion opposite a light-scattering region of the waveguide which is operative to scatter light introduced into the waveguide causing some of the light to be transmitted out of the waveguide through the lens.

It is further contemplated that such a DLS be mounted in an interior trim panel of an automotive vehicle, such as a headliner, door panel, instrument panel, seal panel, etc., with the lens of the frame accommodated in an opening of the panel and the remaining portions of the frame and components of the DLS concealed behind the panel.

The invention further contemplates waveguides having a number of different cross-sectional shapes with at least some of which having a concave exterior profile acting in conjunction with the light-scattering region to focus and collimate some of the scattered light rays that are directed toward the lens of the support frame to provide a high intensity light beam into the interior of a vehicle.

It will thus be apparent that there has been provided in accordance with the present invention a waveguide assembly which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the scope of the appended claims.

I claim:

1. A waveguide assembly for providing illuminating light through an opening in a vehicle panel, comprising:

an elongated support frame having a lower wall extending laterally between two opposing side walls, said lower wall and side walls extending longitudinally to thereby form an elongated channel, said lower wall having a shape that corresponds to the opening in the vehicle panel such that, when the vehicle panel and said support frame are assembled together, said lower wall fits within the opening with edges of said lower wall closely conforming to corresponding edges of the opening in the vehicle panel; and a waveguide located in said channel and extending longitudinally along the length of said channel, said waveguide having first and second ends such that light entering said waveguide at said first end travels through said waveguide along the length of said channel towards said second end;

wherein said waveguide and said lower wall of said support frame are both constructed of a light-transmissive material with said waveguide having a light-scattering region oriented relative to said lower wall such that at least a portion of the light traveling through said waveguide impinges upon said light-scattering region and is directed laterally out of said waveguide and through said lower wall of said support fame.

2. A waveguide assembly as defined in claim 1, wherein said waveguide is oriented such that said light-scattering region is located opposite said lower wall.

3. A waveguide assembly as defined in claim 1, wherein said light-scattering region is continuous along the length of said waveguide.

4. A waveguide assembly as defined in claim 1, wherein said light-scattering region is narrower at said first end than at said second end.

5. A waveguide assembly as defined in claim 1, wherein said support frame includes longitudinally-extending outer shoulders adjacent said lower wall.

6. A waveguide assembly as defined in claim 1, wherein said waveguide includes at least one pair of lateral projections extending away from said channel.

7. A waveguide assembly as defined in claim 1, wherein said side walls each include at least one lateral projection extending away from said channel.

8. A waveguide assembly as defined in claim 1, further comprising a cover enclosing said waveguide within said channel.

9. A waveguide assembly as defined in claim 8, wherein said cover includes a reflective surface extending along the length thereof, said reflective surface being oriented to reflect light laterally exiting said waveguide such that the exiting light is reflected back into said waveguide in a direction generally towards said lower wall.

10. A waveguide assembly as defined in claim 1, wherein said waveguide has a circular cross-sectional shape.

11. A waveguide assembly for providing vehicle interior illumination, comprising:

a vehicle interior panel having front and back sides and an opening therein;

a support frame having a lower wall formed of light-transmissive material, said support frame being mounted at the back side of said interior panel such that said lower wall extends into the opening in said interior panel with only said lower wall being visible from the front side of said panel; and a waveguide attached to said support frame and concealed by said lower wall behind the opening in said interior panel, said waveguide having a light-scattering region oriented relative to said lower wall such that light traveling through said waveguide is deflected out of said waveguide and through said lower wall to thereby provide interior vehicle illumination.

12. A waveguide assembly as defined in claim 11, wherein said opening comprises a longitudinally-extending opening and said waveguide and support frame extend longitudinally along the length of said opening.

13. A waveguide assembly as defined in claim 12, wherein said support frame further includes a pair of opposing side walls extending longitudinally along the length of said opening with said lower wall extending laterally between said side walls, whereby said lower wall and side walls together define an elongated channel, and wherein said waveguide is disposed in said channel.

14. A waveguide assembly as defined in claim 11, wherein said lower wall includes a front surface that is flush with said front side of said interior panel.

15. A waveguide assembly as defined in claim 11, wherein said support frame includes a plurality of lateral projections extending away from said lower wall in contact with said back side of said interior panel.

16. A waveguide assembly as defined in claim 11, wherein said support frame includes longitudinally-extending outer shoulders adjacent said lower wall.

17. A waveguide assembly as defined in claim 11, wherein said waveguide is oriented such that said light-scattering region is located opposite said lower wall.

18. A waveguide assembly as defined in claim 11, further comprising a cover enclosing said waveguide between said cover and said support frame.

19. A waveguide assembly as defined in claim 18, wherein said cover includes a reflective surface extending along the length thereof, said reflective surface being oriented to reflect light laterally exiting said waveguide such that the exiting light is reflected back into said waveguide in a direction generally towards said lower wall.

20. A waveguide assembly as defined in claim 11, wherein said waveguide has a circular cross-sectional shape.

* * * * *